Aug. 26, 1969
JAMES E. WEBB
ADMINISTRATOR OF THE NATIONAL AERONAUTICS
AND SPACE ADMINISTRATION
AUTOMATIC SIGNAL RANGE SELECTOR FOR METERING DEVICES
Filed Feb. 17, 1967
3,464,012
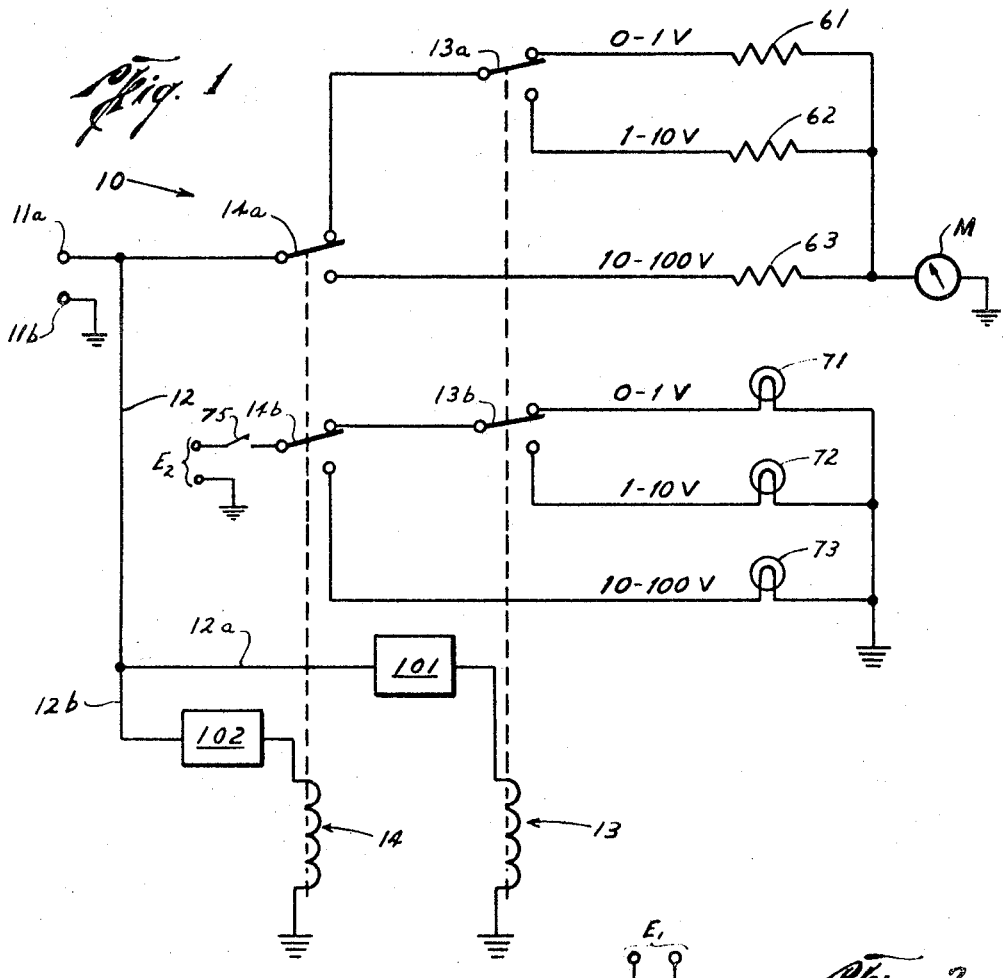
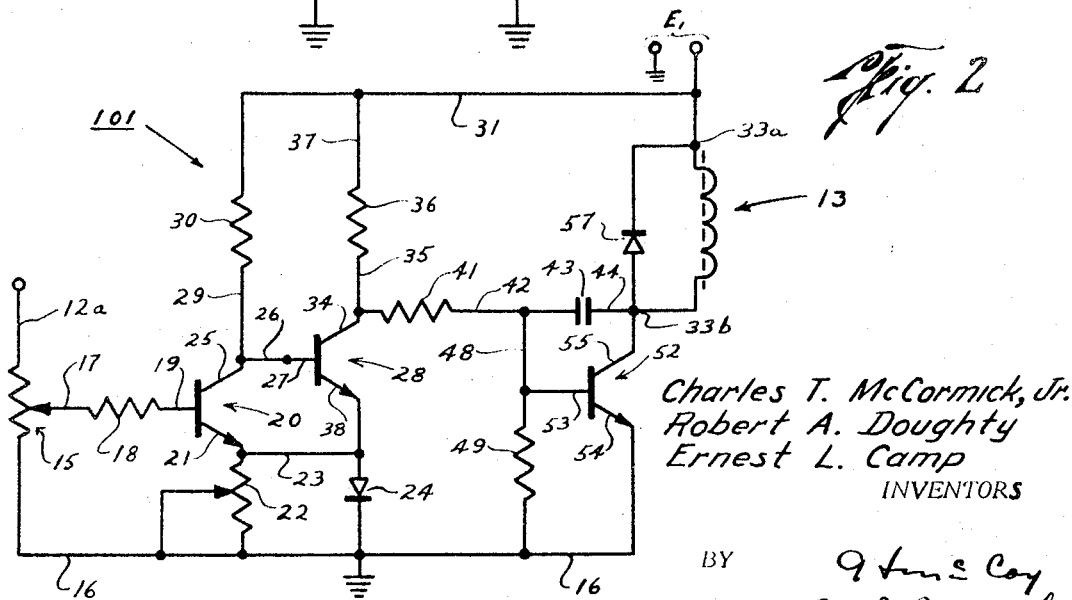
Charles T. McCormick, Jr.
Robert A. Doughty
Ernest L. Camp
INVENTORS
BY
ATTORNEYS

United States Patent Office 3,464,012
Patented Aug. 26, 1969

3,464,012
AUTOMATIC SIGNAL RANGE SELECTOR FOR METERING DEVICES
James E. Webb, Administrator of the National Aeronautics and Space Administration with respect to an invention of Charles T. McCormick, Jr., Houston, Robert A. Doughty, Alvin, and Ernest L. Camp, La Marque, Tex.
Filed Feb. 17, 1967, Ser. No. 617,778
Int. Cl. G01r 1/38, 15/08
U.S. Cl. 324—115                                   2 Claims

ABSTRACT OF THE DISCLOSURE

A voltage range selection apparatus for automatically sensing and applying voltages to electronic instruments without loading the signal source. Signal voltages are sensed by a plurality of voltage sensing and triggering circuits each consisting of a voltage sensing unit and a modified Schmitt trigger which operates with low hysteresis within one percent of the trigger level for operating an associated switching relay. When energized, the associated relay applies the input signal voltage to one of a plurality of meter ranging resistors and selectively applies power to one of a plurality of range indicating lamps.

The invention described herein was made in the performance of work under a NASA contract and is subject to the provision of Section 305 of the National Aeronautics and Space Act of 1958, Public Law 85–568 (72 Stat. 435; 42 U.S.C. 2457).

BACKGROUND OF THE INVENTION

This invention relates to a voltage sensing and selection device, and more particularly to an apparatus for automatically sensing and switching signal voltages.

The disadvantages inherent in manual range selection and application of voltages to electronic instruments such as voltmeters, and the like, are well known. The time spent in range selection and the possibility of instrument damage by excessive voltage frequently precludes the use of such manual range selection devices for many applications. Although automatic range shifting devices are known which mitigate these disadvantages to some extent, these also present problems which limit their usefulness. Complexity of instrumentation, loading of the signal source, and inconstancy in the switching operation are typical problems.

SUMMARY OF THE INVENTION

The voltage sensing and selection device of this invention which has been devised to overcome attendant disadvantages of the prior art devices provides a means of sensing and switching D.C. input signal voltages without loading the signal source. It comprises a plurality of triggering circuits each consisting of a voltage sensing unit for sensing input voltages and a modified Schmitt trigger for controlling application of the input signal voltage to one of a plurality of meter ranging resistors. The Schmitt trigger is adapted to operate with low hysteresis within one percent of the trigger level for operating a switching relay with an output voltage pulse of constant amplitude. The relay, when energized, also selectively applies power from a suitable power source to an appropriate range indicating lamp.

Other objects and many of the attendant advantages of this invention will be readily appreciated by reference to the following detailed description when considered with the accompanying drawings in which like reference numerals designate like parts throughout the figures thereof, and wherein:

FIG. 1 is a schematic-block diagram of the automatic voltage sensing and selecting device of this invention; and FIG. 2 is a schematic diagram of a voltage sensing and triggering circuit of the invention.

Referring more particularly to the drawings, there is shown in FIG. 1 a voltage sensing and selection device 10 which is a preferred embodiment of the invention. A signal voltage which is to be sensed by the device 10 and selectively applied to an electrical instrument such as the voltmeter M is applied to input terminals 11a and 11b of the device 10. The terminal 11a is connected by conductors 12, 12a, and 12b to voltage sensing and triggering circuits 101, 102. For purposes of clarity and simplicity of description, only two such voltage sensing and triggering circuits are shown, although any number might be provided. Each of the circuits 101, 102 is adjustable to respond to a voltage signal of a select amplitude level, and when sensing a voltage of appropriate level energises an associated relay such as the relay 13 or 14 which selectively applies the signal voltage to an appropriate meter ranging resistor associated with the voltmeter M. The relay when energized also connects a suitable power source to an associated voltage range indicating lamp.

A typical voltage sensing and triggering circuit such as the circuit 101 is shown in detail in FIG. 2. The input side of the circuit 101 comprises a potentiometer 15 which is connected at one terminal to the conductor 12a and at its other terminal to ground by the conductor 16. The variable arm 17 of the potentiometer is connected through a one megohm attenuating resistor 18 to the base 19 of an NPN transistor 20. The emitter 21 of the transistor 20 is connected to ground through a variable resistance 22. It is also connected by the conductor 23 to the anode of a diode 24 which is connected in shunt across the resistance 22. The collector 25 of the transistor 19 is coupled by a conductor 26 to the base 27 of a second NPN transistor 28. It is also connected by conductor 29, resistor 30, and the conductor 31 to one terminal 33a of the coil of a double pole double throw relay 13. The collector 34 of the second transistor 28 is also coupled to the same terminal of the relay 13 by means of the conductor 35, resistor 36, and conductors 37 and 31. The emitter 38 is connected to the anode of the diode 24. The collector 34 of the transistor 28 is also coupled to the second terminal 33b of the relay 13 through the resistor 41, conductor 42, capacitor 43, and conductor 44.

The resistor 41 is also connected by the conductors 42 and 48 to one terminal of a resistance 49 which is grounded to the conductor 16. The resistor 41 is also coupled to the base 51 of an NPN transistor 52 by the conductors 42, 48, and 53. The emitter 54 of transistor 52 is connected directly to the ground conductor 16, and the collector 55 of transistor 52 is coupled directly to the terminal 33b of the relay 13.

For establishing collector-base bias for the several transistors, a D.C. power source $E_1$ is connected to apply +26 volts to one side of the resistors 30, 36 and the relay coil.

A diode 57 is connected in shunt with the coil of relay 13 with its anode coupled to the relay terminal 33b and its cathode coupled to relay terminal 33a. The diode 57 protects the transistor 52 from inductive feedback caused by the relay coil.

For operation of the device 10, the variable arm of the potentiometer 15 may be adjusted to provide for any level of triggering from 0 to 100 volts D.C. For purposes of explanation it may be assumed the circuit 101 is set for 1.0 volt triggering and the circuit 102 is set for triggering at 10.0 volts. The potentiometer 15 has therefore been so adjusted that when a signal voltage reaches 1.0 volts the base bias of the transistor 20 allows this transistor to conduct current. As the transistor 20 conducts, its collector voltage which is coupled to the base of transistor 28 decreases, thereby rendering the transistor 28 non-conducting. As transistor 28 is in the non-conductive state, its collector voltage which is coupled to the base of transistor 52 rises sufficiently to cause transistor 52 to become conducting. When the transistor 52 is rendered conducting, current is allowed to flow through the coil of the relay 13 to energize the relay.

The diode 24 is a temperature sensitive device which makes compensation in the circuit for any ambient temperature changes. The variable resistance 22 which is connected to the emitters of both transistors 20 and 28, and in shunt across the diode 24, is a variable sensitivity control which determines the emitter current for the emitters 21 and 38. The amount of emitter current allowed by the control resistor 22 determines the difference between the turn-on voltage and turn-off voltage levels for the transistors 20 and 28. By provision of the control resistor 22, this hysteresis effect or difference between the turn-on and turn-off voltage levels for the circuit is controlled to less than 1% of the voltage triggering level.

When the input signal voltage is less than 1.0 volts, the sensing circuit 101 is in "off" conditon and the input signal is routed through the normally closed upper contacts provided by the relay arms 14a and 13a of the relays 14 and 13, respectively, to the 0 to 1 volt meter ranging resistor 61 coupled to the voltmeter M. When relay contact arm 13a is moved to its lower position, the input signal voltage is routed through the contact arm 13a to the 1 to 10 volt ranging resistor 62. When the voltage sensing circuit 102 is turned "on" by an input signal voltage greater than 10 volts, the relay 14 is energized and the contact arm 14a is moved to its lower contact position to thereby route the signal to the 10 to 100 volt ranging resistor 63.

The device 10 also includes a plurality of voltage range indicating lamps 71, 72, and 73 which are adapted to be powered by a suitable power source $E_2$, such as a battery or the like. When the device 10 is placed in operation, the switch 75 is closed. The relay contact arms 13b and 14b associated with the relays 13 and 14, respectively, are normally in their upper contact positions as shown in FIG. 1, whereby voltage is delivered to the indicating lamp 71. For input signal voltages less than 1 volt, the relays 13 and 14 are de-energized and the lamp 71 is lit. When a signal voltage greater than 1 volt is applied to the input of the device 10, the relay 13 is energized by the circuit 101 and the relay contact arm 13b is moved to its lower contact position to couple the power source $E_2$ with the indicating lamp 72. It will also be seen that if the input signal voltage exceeds 10.0 volts, the circuit 102 responds to energize the relay 14 and simultaneously move the relay contact arms 14a and 14b to their lower contact positions. The power source $E_2$ is thereby coupled to the range indicating lamp 73.

It will also be apparent that when the input signal level is lowered, as for example from a value greater than 10.0 volts to less than 10 volts, a reverse process occurs whereby the circuit 102 turns off at 10 volts. In like manner the circuit 101 turns "off" at 1.0 volts.

It is to be understood, of course, that the meter ranging resistors 61, 62, 63 are selected to provide current equal to the full scale deflection current of the meter at voltage levels of 1 volt, 10 volts, and 100 volts. Furthermore, the range indicating lamps which in the device 10 are subminiature 24 volt lamps, are preferably differently colored and mounted within easy visual range of an operator. However, any number of ranges can be provided by addition of suitable multipliers for the voltmeter M and provision of a corresponding number of voltage sensing and triggering circuits. The voltmeter M could instead be a D.C. ammeter which would require the use of shunt resistors for the meter ranging resistors.

What is claimed and desired to be secured by Letters Patent is:

1. An automatic electrical signal sensing and selection device, said device comprising:

a plurality of meter ranging resistors, each adapted to be selectively coupled to a meter for measuring said signal;

a plurality of signal voltage sensing circuits, each including a trigger circuit responsive to a unidirectional voltage input signal greater than a discrete magnitude;

said trigger circuit including a pair of cascaded transistors having a common variable emitter resistor and a temperature compensating diode in shunt therewith, said variable resistor serving as an sensitivity control means to adjustably limit the difference between the turn-on and turn-off voltage levels of said trigger means, means for delivering a fraction of said signal to said voltage sensing circuits;

a plurality of switching means, each operatively associated with a different one of said trigger circuits, each said switching means being operable in response to operation of its associated trigger circuit to apply the unattenuated input signal to a select one of said meter ranging resistors, and each said trigger circuit comprising a bi-stable pulse generator operable to deliver a voltage pulse of constant amplitude for energizing its associated switching means.

2. An automatic electrical signal sensing and selection device, said device comprising:

a plurality of meter ranging resistors, each adapted to be selectively coupled to a meter for measuring said signal;

a plurality of voltage range indicating lamps;

a power source connectable to deliver electrical power to a select one of said indicating lamps;

a plurality of signal voltage sensing circuits, each including a trigger circuit responsive to a unidirectional voltage input signal greater than a discrete magnitude;

each of said trigger circuits including a pair of cascaded transistors having a common variable emitter resistor and a temperature compensating diode in shunt therewith, each of said variable resistors serving as a sensitivity control means to adjustably limit the difference between the turn-on and turn-off voltage levels of each of said trigger means.

means for delivering a fraction of said signal to said voltage sensing circuits;

a plurality of electromechanical relay switching means, each operatively associated with a different one of said trigger circuits and responsive to operation of its associated trigger circuit to switch the input signal to a select one of said meter ranging resistors and for connecting said power source to a select one of said voltage range indicating lamps, each said trigger means comprising a Schmitt trigger pulse generator operative to deliver a voltage pulse of constant amplitude for energizing its associated relay switching means; and each of said variable resistors associated with a different one of said voltage sensing circuits and trigger circuit means serving to adjustably limit the difference between the turn-on- and turn-off voltage levels of its associated trigger means to within a range of less than 1% of the triggering level of said associated trigger means.

References Cited

UNITED STATES PATENTS

| | | | |
|---|---|---|---|
| 2,400,190 | 5/1946 | Clark | 324—115 |
| 2,512,330 | 6/1950 | Hendrick | 324—115 XR |
| 2,643,344 | 6/1953 | McLaren et al. | 324—115 XR |
| 2,648,015 | 8/1953 | Greenfield et al. | 324—115 XR |
| 2,682,000 | 6/1954 | Clayton et al. | 324—115 XR |
| 2,291,181 | 11/1959 | Leeder | 324—115 XR |
| 3,012,195 | 12/1961 | Slocomb et al. | 324—115 XR |
| 3,016,488 | 1/1962 | Smith et al. | 324—115 |
| 3,133,278 | 5/1964 | Millis | 324—115 XR |
| 3,187,323 | 6/1965 | Flood et al. | 324—115 XR |
| 3,383,594 | 5/1968 | Fiorletta et al. | 324—115 XR |

RUDOLPH V. ROLINEC, Primary Examiner

E. F. KARLSEN, Assistant Examiner